United States Patent [19]

Spirk et al.

[11] 4,322,645
[45] Mar. 30, 1982

[54] LIQUID-COOLED ELECTRIC MACHINE

[75] Inventors: Franz Spirk; Detlef Vandamme, both of Berlin, Fed. Rep. of Germany

[73] Assignee: Siemens Aktiengesellschaft, Munich, Fed. Rep. of Germany

[21] Appl. No.: 132,768

[22] Filed: Mar. 24, 1980

[30] Foreign Application Priority Data

Apr. 4, 1979 [DE] Fed. Rep. of Germany ....... 2913972

[51] Int. Cl.³ ............................................. H02K 9/00
[52] U.S. Cl. ..................................... 310/58; 310/217; 310/260
[58] Field of Search ...................... 310/52, 54, 57, 58, 310/59, 60 R, 60 A, 64, 65, 256, 260, 258, 89, 216, 217

[56] References Cited

U.S. PATENT DOCUMENTS

| | | | |
|---|---|---|---|
| 3,435,265 | 3/1969 | Bennett | 310/260 |
| 3,597,645 | 8/1971 | Duffert | 310/65 |
| 3,714,477 | 1/1973 | Gott | 310/256 |
| 4,031,422 | 6/1977 | Armor | 310/256 |
| 4,152,615 | 5/1979 | Calfo | 310/256 |
| 4,208,597 | 6/1980 | Mulach | 310/59 |

OTHER PUBLICATIONS

Bulletin des Schweizerischen Elektrotechnischen Vereins 1973, pp. 1704-1707.

Primary Examiner—R. Skudy
Attorney, Agent, or Firm—Kenyon & Kenyon

[57] ABSTRACT

A pressure plate for a liquid-cooled electric machine is disclosed which improves heat removal from the end-face region of the stator lamination stack. The pressure plate is provided with a cooling canal formed by a recess on the surface facing the stator lamination stack which is closed off by a cover plate. The cover plate may be provided with a rib on the surface facing the recess. In one embodiment, a plurality of juxtaposed recesses are provided which extend transversely to the pressure fingers of the pressure plate. The pressure plate is preferably made of stainless, non-magnetic steel, i.e., of austenitic chrome-nickel steel.

11 Claims, 2 Drawing Figures

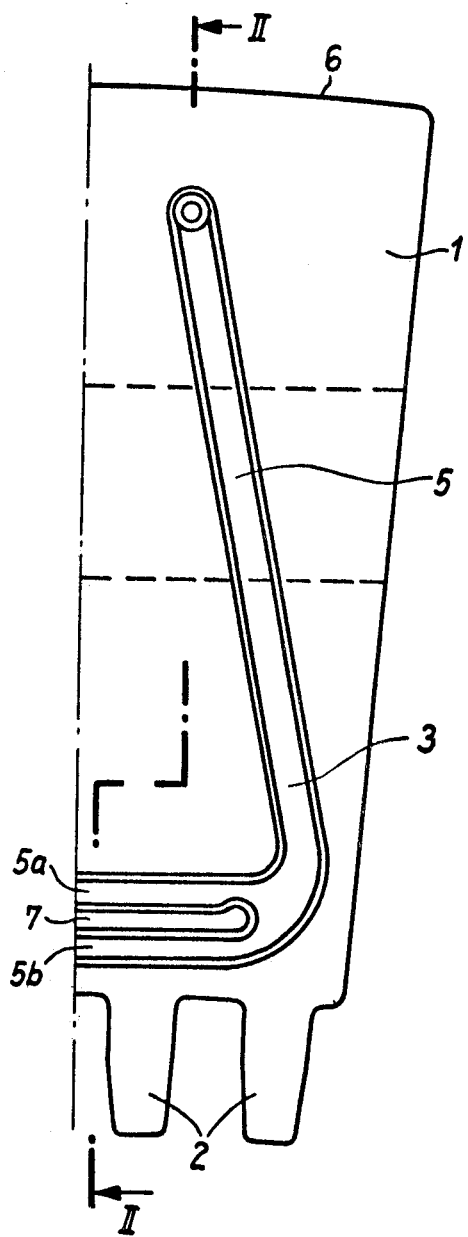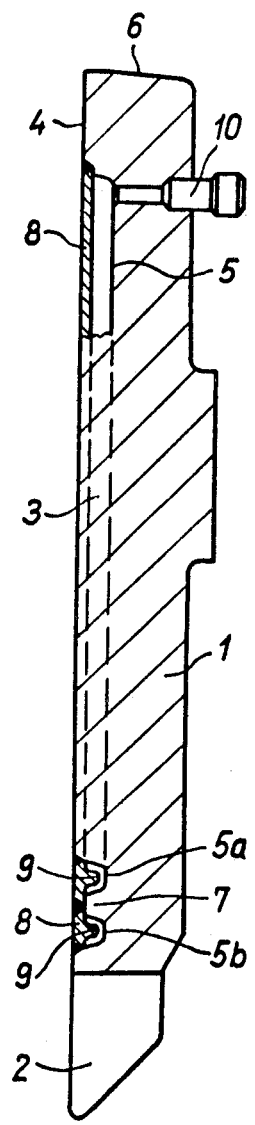

4,322,645

LIQUID-COOLED ELECTRIC MACHINE

BACKGROUND OF THE INVENTION

The present invention relates to a liquid-cooled electric machine having liquid-cooled pressure plates of non-magnetic steel which press the stator lamination stack together.

Liquid-cooled pressure plates having pressure fingers for pressing the lamination stack of a liquid-cooled electric machine are known in the art (see the journal "Bulletin des Schweizerischen Elektrotechnischen Vereins", 1973, page 1707). Since eddy currents are induced by magnetic stray flux emanating axially from the rotor, which can lead to a considerable local temperature increase, especially in the facing end zones of stator lamination stacks of large electric machines, it is advantageous to use liquid-cooled pressure plates. Cooling pipes cast into the pressure plates, however, have the disadvantage that the heat transfer between the pressure plate and the cooling liquid is impeded by the cooling pipe or the contact between the cooling pipe and the pressure plates.

OBJECT AND SUMMARY OF THE INVENTION

It is an object of the present invention to provide for improved heat transfer within liquid-cooled pressure plates for a liquid-cooled electric machine.

According to the invention, a recess is provided in a pressure plate in a liquid-cooled electric machine adjacent to the pressure fingers of the pressure plate on the surface facing the stator lamination stack, with the recess being closed by a cover plate.

Since a cooling canal is formed directly in the pressure plate by the recess, the pressure plate material is in direct contact with the cooling liquid thereby avoiding thermal resistance between the liquid and the pressure plate material. Advantageously, the cover plate is made of stainless steel which precludes corrosion.

Preferably the cover plate is provided with a rib on the surface facing the recess. This reduces the cross section of the cooling canal, independently of the space required for making the welded seams water-tight and pressure-proof. The cooling canal cross section can therefore be chosen sufficiently small that the flow velocity of the cooling liquid flowing through the canal becomes sufficiently large that turbulence occurs. This improves the heat transfer between the liquid and the pressure plate material further. In addition, another advantage is obtained in that the heat-emitting surface of the cover plate is likewise increased.

Because of the large mechanical stresses to which pressure plates are subjected, it is advisable according to the invention to make them of chrome-nickel steel which has sufficient strength and, in addition, is rust-resistant and non-magnetic. The pressure plate is preferably drop-forged to obtain an advantageous fiber pattern and structure condition of the material. However, it is also possible to make the pressure plate by casting.

More particularly, in a liquid-cooled electric machine including a pressure plate of non-magnetic steel which presses the stator lamination stack together, the pressure plate having pressure fingers and including cooling canals for the cooling liquid to flow through the pressure plate, the improvement according to the invention comprises a recess in the pressure plate which extends adjacent to the pressure fingers and a cover plate secured to the pressure plate closing off the recess, the recess and cover plate forming a cooling canal in the pressure plate.

The recess preferably branches into a plurality of recesses adjacent the fingers and extending transversely thereto with such recesses being juxtaposed.

The cover plate is preferably secured to the pressure plate by welding and preferably is provided with a rib or ribs on the surface thereof facing the recess(es).

The recess extends to adjacent an edge of the pressure plate located at the back of the stator lamination stack and means are connected thereto for feeding liquid into and discharging liquid from said recess.

The pressure plate is preferably made of stainless steel, particularly austenitic chrome-nickel steel and the pressure plate is preferably drop-forged.

These and other aspects of the present invention will be more apparent from the following description of the preferred embodiment thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is an elevation view of one-half of a pressure plate facing the lamination stack, the cover plates having been omitted; and FIG. 2 is a cross section taken along line II—II in FIG. 1.

DESCRIPTION OF THE PREFERRED EMBODIMENT

In an hydro-electric generator, the stator lamination stack is pressed together by circular-sector-shaped pressure plates 1, the pressure fingers 2 of which rest on the respective teeth of the stator lamination stack. Measures which ar known and necessary for preventing eddy currents in the vicinity of the pressure fingers 2 are not shown. In order to remove effectively the temperature rise which is nevertheless generated mainly in the vicinity of the pressure fingers 2, the pressure plate 1 is directly cooled with water by means of cooling canals 3.

The cooling canals 3 are disposed on the surface 4 of the pressure plate 1 facing the stator lamination stack. The canals 3 are formed by recesses 5 produced when the pressure plate 1 is drop-forged. The pressure plate is preferably made of austenitic chrome-nickel steel and the recesses 5 start in the vicinity of the edge 6 of the pressure plate 1 situated at the back of the stator lamination stack and progress to adjacent the outer pressure fingers 2 where they then run transversely to the pressure fingers 2. In the immediate vicinity of the pressure fingers, the recess 5 divides into two juxtaposed transversely-extending branches 5a and 5b separated by a bulge 7. The recesses 5 and its branches 5a and 5b are closed off by a correspondingly formed cover plate 8, which is welded water-tight and pressure-proof to the edges of the recess 5 and its branches 5a, 5b. In the area of the parallel recess branches 5a and 5b, the cover plate 8 has ribs 9 on the cover plate surface facing the recess branches 5a, 5b. These ribs therefore extend into the cooling canals 3 formed by the recess branches 5a, 5b and reduce their cross section, so that the flow velocity of the water is increased in the region adjacent to the pressure fingers 2. This has the advantage that turbulence occurs, which improves heat transfer. In addition, the ribs 9 increase the surface area of the cover plates that come into contact with the water thereby aiding cooling. To feed the water into and discharge the water from the pressure plate 1, the ends of the recess 5 which are located in the vicinity of the rim 6 of the pressure plate 1, are connected to pipe nipples 10.

A pressure plate 1 according to the invention has the advantage that the pressure plate material forms the walls of the cooling canals 3. The contact between the cooling water and the pressure plate is therefore direct and not impeded by additional thermal transition resistances. The same applies to the cover plate 8 which in turn rests directly against the stator lamination stack and is exposed to the water flow. The lowest possible thermal resistance between the end zones of the stator lamination stack, of the pressure plate 1 and the cover plate 8 on the one hand, and the cooling liquid on the other hand, is therefore achieved. Due to the special shape of the cooling canals 3, not only is the heat from the area adjacent to the pressure fingers removed, but also from the remaining area of the pressure plate.

The advantages of the present invention, as well as certain changes and modifications of the disclosed embodiment thereof, will be readily apparent to those skilled in the art. It is the applicants' intention to cover by their claims all those changes and modifications which could be made to the embodiment of the invention herein chosen for the purpose of the disclosure without departing from the spirit and scope of the invention.

What is claimed is:

1. In a liquid-cooled electric machine including a pressure plate of non-magnetic steel which presses the stator lamination stack together, the pressure plate having pressure fingers and including cooling canals for cooling liquid to flow through the pressure plate, the improvement comprising a recess in the pressure plate which extends adjacent to the pressure fingers and a cover plate secured to the pressure plate closing off the recess, said cover plate being provided with a rib on the surface thereof facing said recess, said recess and said cover plate forming a cooling canal on the pressure plate.

2. The improvement according to claim 1, wherein said recess branches into a plurality of recesses adjacent the fingers and extending transversely thereto.

3. The improvement according to claim 2, wherein said recesses are juxtaposed.

4. The improvement according to claim 1, in which said cover plate is secured to the pressure plate by welding.

5. The improvement according to claim 2, wherein the cover plate is provided with ribs on the surface thereof facing said transversely extending recesses.

6. The improvement according to claim 1, wherein said recess extends to adjacent an edge of the pressure plate located at the back of the stator lamination stack and means are connected thereto for feeding liquid into and discharging liquid from said recess.

7. The improvement according to claim 1, wherein said pressure plate is made of stainless steel.

8. The improvement according to claim 1, wherein the pressure plate is made of austenitic chrome-nickel steel.

9. The improvement according to claim 8 or 10, wherein the pressure plate has a drop-forged fiber pattern and structure.

10. In a liquid-cooled electric machine including a pressure plate which presses the stator lamination stack together, the pressure plate having pressure fingers and including cooling canals for cooling liquid to flow through the pressure plate, the improvement comprising a recess in the pressure plate on the side thereof facing the stator lamination stack, at least part of the recess extending adjacent to the pressure fingers and transversely thereof, and a cover plate closing off the recess secured to the pressure plate by welding, said cover plate being provided with a rib on the surface thereof facing said recess, said pressure plate and said cover being made of non-corrosive austenitic chrome-nickel steel.

11. The improvement according to claim 10, wherein two juxtaposed recesses are provided extending transversely of the pressure fingers.

* * * * *